United States Patent

[11] 3,609,625

| | | |
|---|---|---|
| [72] | Inventors | Osamu Watanabe;<br>Takeshi Shiota, both of Tokyo, Japan |
| [21] | Appl. No. | 816,884 |
| [22] | Filed | Apr. 15, 1969 |
| [45] | Patented | Sept. 28, 1971 |
| [73] | Assignee | Kyowa Electronic Instruments Company, Ltd.<br>Tokyo, Japan |
| [32] | Priority | Feb. 15, 1966 |
| [33] | | Japan |
| [31] | | 41/8594 |

[54] SEMICONDUCTOR STRAIN GAUGE
3 Claims, 5 Drawing Figs.

[52] U.S. Cl. .................................................. 338/3
[51] Int. Cl. .................................................. G01l 1/22
[50] Field of Search ............................................. 338/2–6, 22
SD, 22; 29/620; 73/88.5 SD

[56] References Cited
UNITED STATES PATENTS
2,621,276 12/1952 Howland ..................... 29/620 X
3,137,834 6/1964 Pfann ........................... 338/6

FOREIGN PATENTS
1,007,031 10/1965 Great Britain ................ 338/2

OTHER REFERENCES
Bell Laboratory Record, Vol. 37 (1959) pp. 7– 9, Semiconductors in Strain Gauges by W. P. Mason The Strain Gage Primer by C. C. Perry and H. R. Lissner, 2nd ed. McGraw Hill Book Co. N.Y. Pp. 286, 287, 20, 21, 22

*Primary Examiner*—Reuben Epstein

ABSTRACT: A temperature-compensated strain gauge for affixing to a specimen, fabricated from a vacuum-evaporated thin film semiconductor of P-type germanium bonded to a suitable substrate. The specific resistance of the germanium is selected so that the resistance-temperature coefficient of the gauge when attached to the specimen is substantially equal to zero.

INVENTORS:
OSAMU WATANABE
TAKESHI SHIOTA

BY
Buckman and Archer
ATTORNEYS

SEMICONDUCTOR STRAIN GAUGE

This invention relates to strain gauges; more particularly, it relates to stain gauges employing semiconductors as the measuring element.

Semiconductor strain gauges have been found to possess a number of advantages over the more common wire gauges that have been used in the past. Among these advantages are the fact that they are a great deal more sensitive and they can be provided with either positive or negative gauge factors.

The currently available semiconductor strain gauges are manufactured by the relatively complicated processes of slicing, lapping, and dicing an individual gauge element from a larger single semiconductor crystal. This process results in considerable loss of material and also causes the finally produced semiconductor strain gauges to be more expensive than wire strain gauges.

Several specific problems are also encountered in these currently available semiconductor gauges. As a rule, the available gauges cannot provide linearity of the strain/resistance charge characteristic at larger strain values. This results in the common use of Wheatstone bridge circuits to correct for the nonlinearity. Furthermore, such strain gauges are usually precompressed when they are mounted and cured. This precompression of the sensing element causes a change in the temperature coefficient of resistance of the gauge unit. Still further, it has been found that the existing gauges exhibit considerable temperature dependence.

It has been discovered that thin film techniques make possible the development of a semiconductor strain gauge wherein the aforementioned problems and disadvantages are greatly reduced or eliminated. Strain gauges comprising a thin film of semiconductor material upon a suitable substrate, not only possess superior characteristics relative to conventional semiconductor gauges; they also may be produced more conveniently and economically. It will be appreciated that the expression "thin film" is commonly used in contrast to the term "bulk" in the field of solid state physics. This term refers to the film of a substance which is formed after passing through a state of molecularity. Generally, a thin film of a substance can be formed by vacuum evaporation, plating, or sputtering. The term "bulk" refers to a mass or plate produced by a metallurgical process such as rolling, forging, or growing from a seed. In the area of semiconductors, one develops bulk semiconductors in single-crystal form from a seed which has been dipped in and grown from a bath of melted semiconductor material. In contrast with this, a "thin film" semiconductor as disclosed in this specification, is of polycrystalline nature and has been developed from an evaporated semiconductor material wherein the molecules are so far separated from each other that they are substantially independent, An object of the present invention is to provide improved semiconductor strain gauges.

Another object of the present invention is to provide semiconductor strain gauges that can be conveniently produced.

Another object of the present invention is to provide semiconductor strain gauges that exhibit superior characteristics with respect to linearity and temperature variation.

Another object of the present invention is to provide an improved semiconductor strain gauge wherein the measuring element comprises a thin film of semiconductor material.

Another object of the present invention is to provide a self-temperature-compensating thin film semiconductor strain gauge.

Of course, the mechanical and physical limitations imposed upon a strain gauge are often dictated by the use to which it is put. Thus, size is limited by the space available and the magnitude of the gauge factor and linearity are limited by the specific conditions being measured. In the fabrication of thin film semiconductor gauges several factors are relevant to these considerations.

Selection of the substrate material upon which the film is deposited, is an important factor determining the characteristics of the gauge. The most desirable substrates have a high value of electric resistivity, exhibit good heat resistivity, and are suitable for crystal growing. Suitable substrates, for example, include glass, mica, and insulated metallic foil.

Another significant factor in the production of thin film semiconductor gauges concerns the temperature of the substrate during deposition of the film. This temperature effects the resistivity, gauge factor, and temperature of the dependence of the film. In addition, it must be noted that an insufficient substrate temperature may result in improper bonding between the film and substrate.

It is also important to note that thickness of deposited thin films and the manner of deposition effects the characteristics of the gauge.

The rate at which a deposited film is formed is proportional to that at which the material is evaporated, and the evaporating rate is determined by the residual gas pressure and temperature at the source of evaporation. Thin films are usually formed at a deposition rate of several tens of A/sec. Use of greater deposition rate and resulting crystallographic damage of the thin films thereby lowering the physical properties.

The thickness of deposited thin films is determined by the product of deposition rate and deposition time. Evaporated thin films need to be more than $1\mu$ in thickness when applied for the manufacture of a strain gauge in view of the required strength for the electrode attachment. An attempt to form a thicker film deposition involves internal strains, and an extension of depositing time contributes to the introduction of impurities.

It is important to note that the nature of deposited films are generally different from that of the material to be evaporated. Evaporated films of germanium are of P-type irrespective of the conductivity type, P- or N-type, of the material to be evaporated. N-type evaporated films can be produced by doping with higher solubility of N-type impurities.

The above objects of the invention in addition to further objects and advantages will be apparent from the following detailed description taken in conjunction with the drawing wherein.

Figure 1:
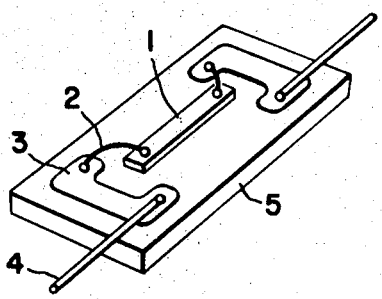
FIG. 1 illustrates the structure of a conventional bulk-type semiconductor strain gauge having a resistance element fabricated from a semiconductor single crystal.

As shown in FIG. 1, a conventional semiconductor strain gauge uses, for its resistance element 1, a small piece of semiconductor cut from a semiconductor single-crystal material. The resistance element 1 is fixed on an insulating substrate 5. The resistance element 1 is made of a semiconductor such as silicon, germanium, or the like. In order to provide electrical connections, conductors 2 are fastened to terminals 3 which in turn connect to lead wires 4. The insulating substrate 5 supports both resistance element 1 and terminals 3 on its surface.

Figure 2:
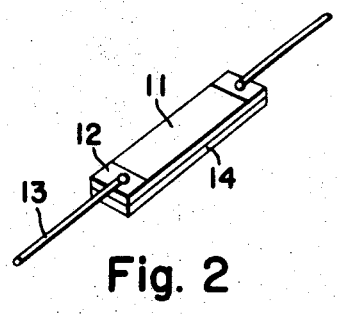
FIG. 2 illustrates the structure of a self-temperature-compensating thin film semiconductor strain gauge according to this invention.

The strain gauge of the present invention is illustrated in FIG. 2. The resistance element 11 is bonded to a substrate 14 and is connected to lead wire 13 by terminals 12. Resistance element 1 is a thin film resistor and is preferably obtained by vacuum evaporating a single crystal of semiconductor material, such as germanium or silicon, on to the substrate 14. The substrate 14 may be preferably made of glass or mica, and supports resistor element 11 and terminals 23 on its surface. Thus, the substrate functions as an insulator separating resistance element 11 from a specimen under test on which the strain gauge is to be attached. The terminals 12 may be formed in any of the ways familiar in the semiconductor art. In one typical technique, the thin film semiconductor strain gauge shown in FIG. 2 can be manufactured by first forming the thin film resistance element on the substrate 14 and then forming the terminals on each end of the substrate. Obviously, the manner of manufacturing the semiconductor strain gauge according to this invention is significantly simplified when compared with the prior known bulk-type strain gauge.

As already mentioned the characteristics of the thin film 11 are much influenced by the temperature of the substrate at the time of vacuum evaporation, the condition of the vacuum evaporation, and the material of the substrate. For instance, if germanium is evaporated on a hard glass substrate at the pressure of $1 \times 10^{15}$ mmHg vacuum and at the deposition rate of 50 A/sec., the specific resistance or ohm-cm of the germanium thin film thus obtained is determined only by the temperature of the substrate at the time of evaporation. If this temperature is 300° C., a germanium thin film of 0.3 ohm-cm. specific resistance can be obtained, and the specific resistance will lower with increase of the temperature until it reaches a minimum value in the vicinity of 500° C.

Figure 3:
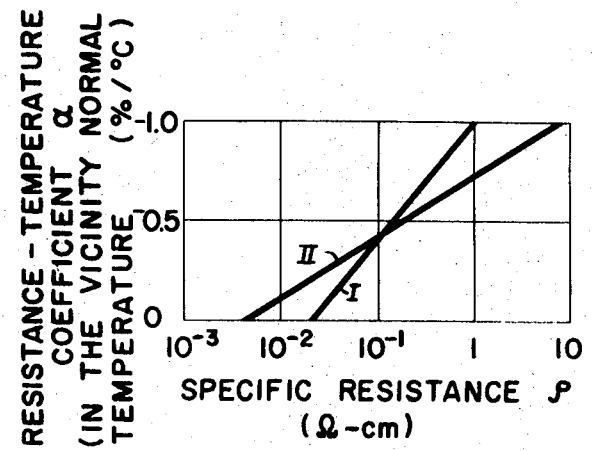
FIG. 3 is a graph showing the relation between the specific resistance and the temperature-resistance coefficient of a typical bulk semiconductor.

The resistance-temperature coefficient of semiconductor material is determined almost solely by the specific resistance. FIG. 3 illustrates the relation between the specific resistance and the resistance-temperature coefficient of bulk semiconductor material. The curve I is for the P-type silicon and the curve II is for the N-type germanium. It is apparent from FIG. 3 that the resistance-temperature coefficient lowers with the decrease of the specific resistance. As a matter of course, it is preferable to use the semiconductor having lower resistance-temperature coefficient for the strain gauge. However, when the resistance-temperature coefficient needs to be taken into account, the variation of the coefficient caused by the attachment of the strain gauge to the specimen under test must be considered.

The resistance-temperature coefficient $\gamma$ of the strain gauge when attached to a specimen under test is expressed by the following equation:

$$\gamma = \alpha + K(\beta_s - \beta_g) \quad (1)$$

In this equation, $\alpha$ is the resistance-temperature coefficient of the resistance element of the strain gauge prior to the attachment thereof to the specimen under test, $K$ is the gauge coefficient, $\beta_g$ is the linear expansion coefficient of the resistance element of the strain gauge and $\beta_s$ is the linear expansion coefficient of the specimen under test.

Since $\beta_s \geq 10 \times 10^{16}/°$ C. for most metals and if $K=100, \beta_g=4 \times 10^{16}/°$ C. (for silicon), the variation of the temperature coefficient $\Delta\alpha$ can be expressed by the equation:

$$\Delta\alpha = K(\beta_s - \beta_g) \geq 6 \times 10^{14}/° C. \quad (2)$$

Hence, the value of $\alpha$ which makes $\gamma$ equal to 0 will be $$\alpha \leq -6 \times 10^{14}/° C. \quad (3)$$

However, it is actually impossible to make the temperature coefficient of semiconductor bulk material of low specific resistance small over a wide temperature range, because of the nonlinearity of the resistance-temperature coefficient. The specific resistance of the material used is low. As a consequence, the resistance element must be made extremely long and narrow in order that it will have required resistance for the strain gauge. This imposes a limitation on the machining of the resistance element. Practically, the minimum section realized by machining will be about $10^{14}$ cm.$^2$, and the maximum length will be about 1 cm. In this connection, single-crystal substances of less than $10^{12}$ ohm-cm. specific resistance cannot be used for the purpose of obtaining gauge resistance in the neighborhood of 100 ohms.

According to this invention the drawbacks in the resistance-temperature characteristic of the bulk semiconductor strain gauges are eliminated by utilization of thin film semiconductors. Detailed explanation about this point will be made with reference to FIGS. 4 and 5.

Figure 4:
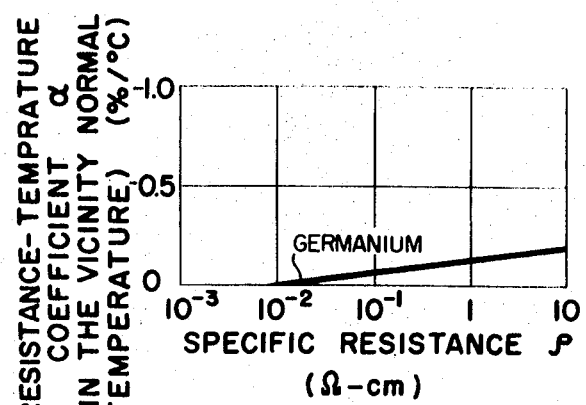
FIG. 4 is a graph showing the relation between the specific resistance and the temperature-resistance coefficient of a thin film semiconductor.
Figure 5:
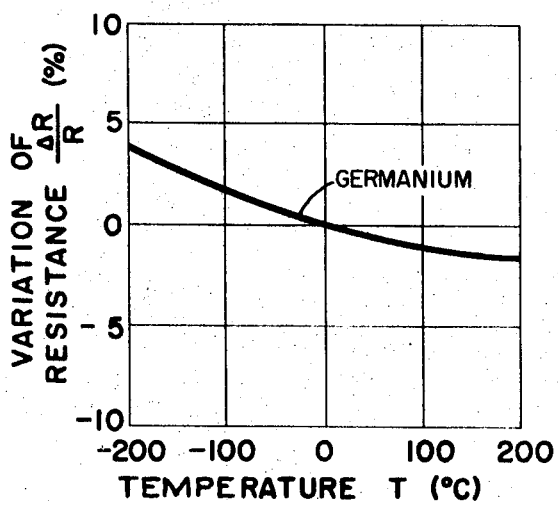
FIG. 5 indicates the resistance-temperature characteristic of a self-temperature-compensating thin film semiconductor strain gauge according to this invention.

FIG. 4 shows the relation between the specific resistance and the resistance-temperature coefficient for a thin film semiconductor of P-type germanium and FIG. 5 shows the resistance-temperature characteristic for self-temperature-compensating thin film semiconductor strain gauge according to this invention. As is apparent from FIG. 4, the thin film semiconductor resistance element has relatively small variation of resistance-temperature coefficient with respect to the variation of the specific resistance, and as seen from FIG. 5, the resistance-temperature characteristic is substantially linear in a wide temperature range.

The characteristics of one example of P-type germanium thin film are shown in FIG. 5. However, if the manufacturing conditions for the thin film are fulfilled, similar results can be obtained.

A comparative table of the characteristics of each of a resistance wire-type strain gauge, a semiconductor strain gauge, and the self-temperature-compensating thin film semiconductor strain gauge in accordance with this invention is given as follows:

| Kinds of strain gauge | Characteristics | | | | |
| --- | --- | --- | --- | --- | --- |
| | Gauge factor (K) | Non-linearity, percent (see *) | Resis., temp. co-efficient ($\gamma$) | Sensitivity, temp. coef. | Drift coef. ($\gamma/K$) |
| Copper-nickel alloy strain gauge | 2 | 0.1 | $2 \times 10^{-5}/°$ C. | $2 \times 10^{-4}/°$ C. | $1 \times 10^{-5}/°$ C. |
| Bulk semiconductor strain guage | 100 | 1.0 | $2 \times 10^{-3}/°$ C. | $2 \times 10^{-3}/°$ C. | $2 \times 10^{-5}/°$ C. |
| Self temp. compensating thin film semiconductor strain gauge | 30 | 0.2 | $1 \times 10^{-4}/°$ C. | $5 \times 10^{-4}/°$ C. | $3.3 \times 10^{-6}/°$ C. |

* At $1,000 \times 10^{-6}$ strain rated value.

In the table, the drift coefficient $\gamma/K$ indicates the dependability on temperature, and the smaller the value, the better.

It will be apparent that the machining limitations which have been an obstacle to the design of bulk semiconductor strain gauges, have been eliminated by this invention. In other words, it is possible to easily manufacture an ideal strain gauge whose resistance-temperature coefficient $\gamma$ as expressed by equation (1) is approximately null within a wide range of temperature. Taking one example of the P-type germanium semiconductor strain gauge which is to be attached to a steel piece under test ($\beta_s = 11 \times 10^{16}/°$ C.), $K=30$ and $\beta_g = 6 \times 10^{16}/°$ C. and, therefore, the value of $\alpha$ which brings about $\gamma=0$ is $-15 \times 10^{15}/$ C. If $-15 \times 10^{15}/°$ C. is expressed in terms of %/° C., it will be $-0.015\%/°$ C. Referring to FIG. 4, the corresponding value of specific resistance of the thin semiconductor film can be determined to be $2 \times 10^{12} \Omega$ cm. Thus, a perfect self-temperature-compensating thin film semiconductor strain gauge for the steel specimen as specified above can be obtained.

One illustrative embodiment of the invention has been shown and described. It should be understood that modifications may be made by those skilled in the art and any such modifications as fall within the true spirit and scope of the invention are intended to be embraced within the scope of the following claims.

What is claimed is:

1. A temperature-compensated strain gauge for affixing to a specimen comprising a vacuum-evaporated thin film of P-type germanium bonded to a substrate, said germanium having a specific resistance such that the resistance-temperature coefficient prior to attachment to the specimen is substantially equal and opposite to $K(\beta_s-\beta_g)$, where $K$ is the gauge coefficient, $\beta_g$ is the linear expansion coefficient of the germanium, and $\beta_s$ is the linear expansion coefficient of the specimen.

2. A strain gauge according to claim 1, wherein said film has a specific resistance of less than $10^{11}$ ohm-cm.

3. A strain gauge according to claim 2, wherein said film is deposited upon an insulating substrate and electrical connections are made thereto.